(12) United States Patent
Highnote

(10) Patent No.: US 9,629,502 B2
(45) Date of Patent: Apr. 25, 2017

(54) CONVECTION RECIRCULATING FRYER FOR COOKING FOODS

(71) Applicant: PEARL CITY MANUFACTURING, INC., Douglasville, GA (US)

(72) Inventor: David R. Highnote, Douglasville, GA (US)

(73) Assignee: PEARL CITY MANUFACTURING, INC., Douglasville, GA (US)

( * ) Notice: Subject to any disclaimer, the term of this patent is extended or adjusted under 35 U.S.C. 154(b) by 62 days.

(21) Appl. No.: 14/553,114

(22) Filed: Nov. 25, 2014

(65) Prior Publication Data

US 2015/0157175 A1 Jun. 11, 2015

Related U.S. Application Data

(63) Continuation of application No. 14/148,374, filed on Jan. 6, 2014, which is a continuation of application No. 12/435,722, filed on May 5, 2009, now Pat. No. 8,646,382.

(51) Int. Cl.
*A47J 37/12* (2006.01)

(52) U.S. Cl.
CPC ....... *A47J 37/1223* (2013.01); *A47J 37/1233* (2013.01); *A47J 37/1276* (2013.01)

(58) Field of Classification Search
CPC ............... A47J 37/1223; A47J 37/1233; A47J 37/1204; A47J 37/1219; A47J 37/1247; A47J 37/1266; A47J 27/0817; A47J 36/00
See application file for complete search history.

(56) References Cited

U.S. PATENT DOCUMENTS

| | | | |
|---|---|---|---|
| 3,608,472 A | * | 9/1971 | Pelster ............... A47J 27/0817 200/81.9 M |
| 3,667,374 A | | 6/1972 | Holmes |
| 3,750,560 A | | 8/1973 | Holmes |
| 4,487,691 A | | 12/1984 | Panora |
| 4,506,598 A | | 3/1985 | Meister |
| 4,599,990 A | | 7/1986 | Fritzsche et al. |
| 4,704,290 A | | 11/1987 | Fritzsche |
| 4,850,821 A | | 7/1989 | Sakai |
| 4,945,893 A | * | 8/1990 | Manchester ........ A47J 37/1223 126/391.1 |
| 5,013,949 A | | 5/1991 | Mabe, Jr. |

(Continued)

FOREIGN PATENT DOCUMENTS

JP 2005296417 10/2005

OTHER PUBLICATIONS

International Search Report in related PCT/US2010/031552 dated Nov. 17, 2010.

*Primary Examiner* — Brian Jennison

(74) *Attorney, Agent, or Firm* — Morris, Manning & Martin, LLP; Daniel E. Sineway, Esq.

(57) ABSTRACT

A convection recirculating food product fryer with a fry tank with and inlet tube connected to a heat exchanger and an outlet connected to a magnetic pump with an outlet tube to the heat exchanger, the pump having a driving magnet assembly housing an impeller and a driven magnet, with a ceramic shaft extending through the impeller about which the impeller rotates when pumping oil; an electric motor magnetically coupled to the magnetic pump; a burner to heat the oil in the heat exchanger; a controller to control the ignition and running of the burner.

20 Claims, 5 Drawing Sheets

(56) References Cited

U.S. PATENT DOCUMENTS

| | | | |
|---|---|---|---|
| 5,288,213 A | | 2/1994 | Nasr |
| 5,302,091 A | | 4/1994 | Horiuchi |
| 5,334,004 A | | 8/1994 | Lefevre et al. |
| 5,580,216 A | | 12/1996 | Munsch |
| 5,680,811 A | * | 10/1997 | Highnote ............ A47J 37/1233 210/167.28 |
| 5,716,657 A | * | 2/1998 | Liebermann .......... A23L 1/0107 426/232 |
| 5,958,205 A | | 9/1999 | Ingalls et al. |
| 5,993,176 A | * | 11/1999 | Kingsford ............... F04D 5/002 415/173.2 |
| 6,453,801 B1 | | 9/2002 | Masel et al. |
| 6,590,187 B1 | | 7/2003 | Kaneko |
| 6,712,585 B2 | | 3/2004 | Iehl et al. |
| 6,745,669 B2 | | 6/2004 | Suzuki |
| 6,854,457 B2 | | 2/2005 | Rabas et al. |
| 7,029,246 B2 | | 4/2006 | Miller et al. |
| 7,267,532 B2 | | 9/2007 | Krebs |
| 7,988,819 B1 | | 8/2011 | Scheide et al. |
| 2002/0031436 A1 | | 3/2002 | Maeda et al. |
| 2002/0069767 A1 | | 6/2002 | Wendel et al. |
| 2003/0053914 A1 | | 3/2003 | Iehl et al. |
| 2006/0245955 A1 | | 11/2006 | Horiuchi et al. |
| 2007/0137497 A1 | | 6/2007 | Savage et al. |
| 2009/0081059 A1 | | 3/2009 | Seki et al. |
| 2009/0084273 A1 | * | 4/2009 | Lackman ............ A47J 37/1266 99/408 |
| 2010/0061869 A1 | | 3/2010 | Kwon et al. |
| 2011/0061545 A1 | | 3/2011 | Foster et al. |

\* cited by examiner

CONVECTION RECIRCULATING FRYER FOR COOKING FOODS

CROSS REFERENCE TO RELATED APPLICATIONS

This Application is a continuation application of U.S. patent application Ser. No. 14/148,374 filed Jan. 6, 2014, entitled "Convection Recirculating Fryer for Cooking Foods," by David R. Highnote, pending, which is a continuation application and claims the benefit of and priority under 35 U.S.C. §120 to U.S. patent application Ser. No. 12/435,722 filed May 5, 2009, entitled "Convection Recirculating Fryer for Cooking Foods," by David R. Highnote, now patented as U.S. Pat. No. 8,646,382 issued Feb. 11, 2014, which is hereby incorporated by reference herein as if set forth herein in its entirety.

TECHNICAL FIELD

The present invention is generally related to a convection frying apparatus for cooking foods within a recirculating bath of cooking liquid.

BACKGROUND OF THE INVENTION

Although there are many ways to prepare food for consumption, one common method of preparing foods is to cook the food by frying. Additionally, one method of frying food is to "deep fry" the food by placing the uncooked food in a quantity of-cooking liquid, in most deep frying situations, the cooking liquid typically comprises a cooking oil, such as vegetable oil or animal fat. The food product is immersed in the cooking oil. The cooking oil is typically at a high temperature, such as above 350 degrees Fahrenheit.

Devices for deep frying are common in commercial food preparation environments. They are also becoming increasingly common in the home environment. Although a commercial frying apparatus and a home frying apparatus may he constructed on different scales, these two types of fryers have some of the same basic features.

The primary feature of a typical fryer, whether commercial or residential, is a cooking tank housing the heated bath of cooking oil The cooking tank is usually designed so that it may receive a metal basket into the tank. Food is placed in the metal basket and lowered into the cooking oil so that the food is at least partially submersed in the oil.

A heating device is typically used to maintain the oil in the tank at a substantially constant temperature. This heating device usually comprises a gas burner placed below the tank.

The typical fryers used in commercial and residential sailings do not remove the oil from the tank during operation. The cooking oil simply remains in the tank and the temperature of the oil is regulated by heating the oil while the oil remains in the tank. In contrast a recirculating fryer removes oil from the tank, adjusts the heat energy in the oil, and then returns the oil to the tank.

There have been previous attempts to develop a commercial recirculating fryer. However, these recirculating fryer designs have all suffered from a number of limitations. For example, some recirculating fryer designs exhibited problems with leaking seals in the pump. The pump seals became worn with use and began to leak. Other designs, while not necessarily having a problem with leaking seals, experienced failure of the pump bearings. This was usually a result of the arrangement of the pump. In general, the prior recirculating fryers were far too expensive to maintain in order to be feasible for commercial use.

Thus, a heretofore unaddressed need exists in the industry to develop a convection recirculating fryer that is efficient, cost-effective, and having reasonable maintenance costs.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

A convection recirculating fryer of one exemplary embodiment comprises, generally, a fryer housing forming a tank, and encasing a pump and a heat exchanger. Although all of these elements are not required by the invention disclosed herein, these three elements are the basic components of an exemplary embodiment of a convection recirculating fryer.

| PARTS LIST |
| --- |
| 10. Convection fryer |
| 11. Free standing housing |
| 13. Fry tank |
| 16. Oil inlet orifice |
| 17. Oil outlet orifice |
| 18. Filter screen |
| 19. Bottom of tank |
| 20. Oil dispersement pipe |
| 21. Magnetic pump |
| 22. Pump inlet line |
| 26. Motor |
| 27. Motor casing |
| 28. Motor shaft |
| 29. Driving magnet assembly |
| 31. Impeller housing |
| 32. Driven magnet |
| 34. Impeller |
| 35. Pump housing |
| 46. Hot oil supply line |
| 50. Blower |
| 52. Fuel injector tube |
| 54. Glow plug with flame sensor |
| 56. A-D Fuel injectors |
| 58. Gas manifold |
| 60. Perforated burner sleeve |
| 62. Control |
| 64. Ceramic pump shaft |
| 66. Magnet |

-continued

PARTS LIST

67. Seal
68. Filter pump

Figure 1A:
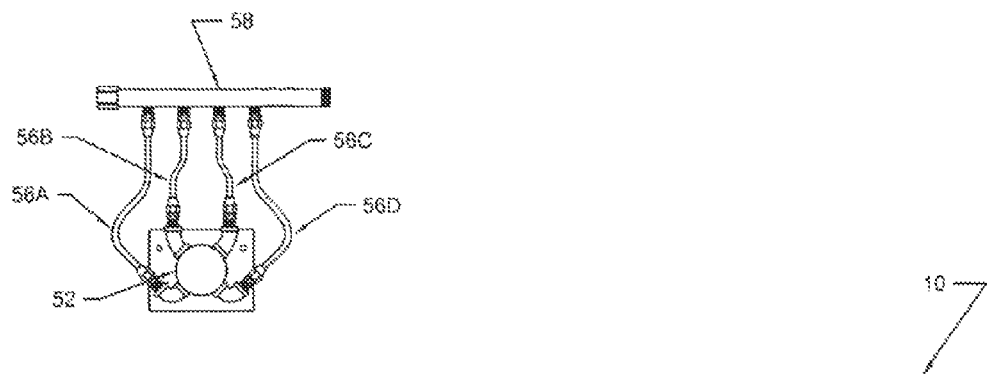
FIG. 1A is section view of the gas injectors of the convection recirculating fryer of FIG. 1.
Figure 1:
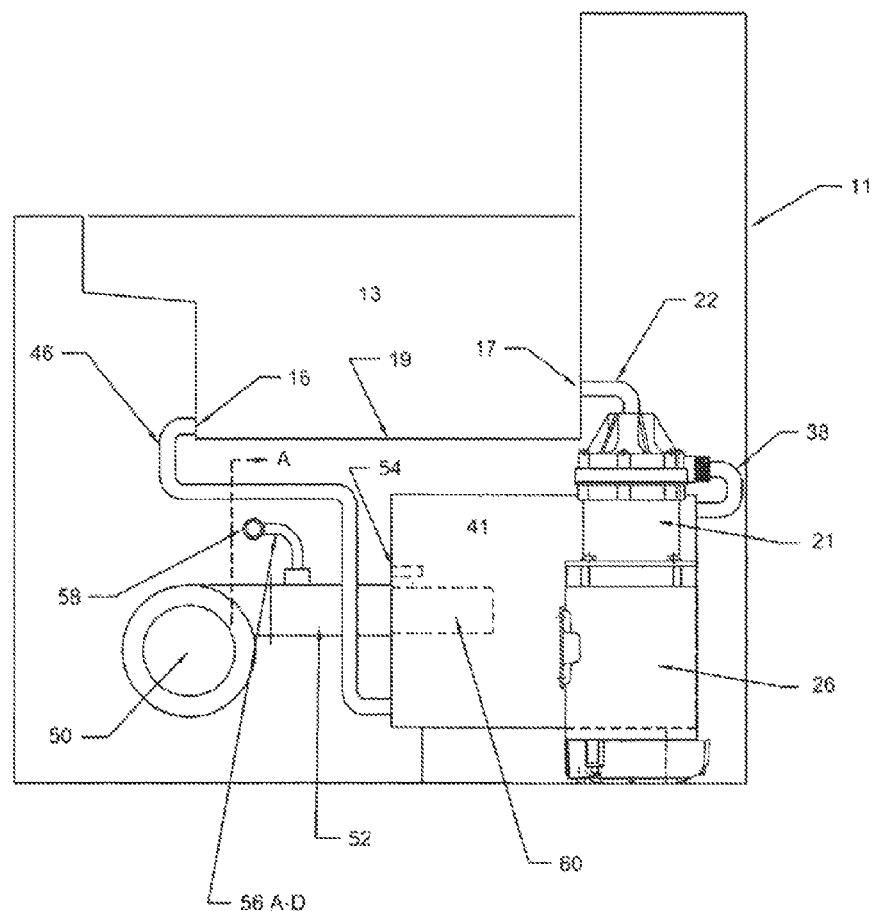
FIG. 1 is a side view of the convection recirculating fryer.

An exemplary embodiment of a convection recirculating fryer 10 is depicted in FIG. 1. FIG. 1 is not to scale and is merely presented to provide a general understanding of the components of the convection recirculating fryer 10. The arrangement of the components of the convection recirculating fryer 10, as discussed below, is only one exemplary arrangement.

Figure 2A:
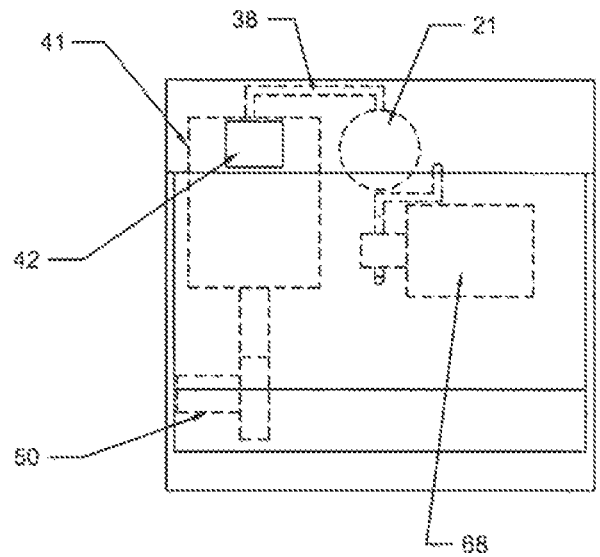
FIG. 2A is a top view of the convection recirculating fryer of FIG. 1
Figure 2B:
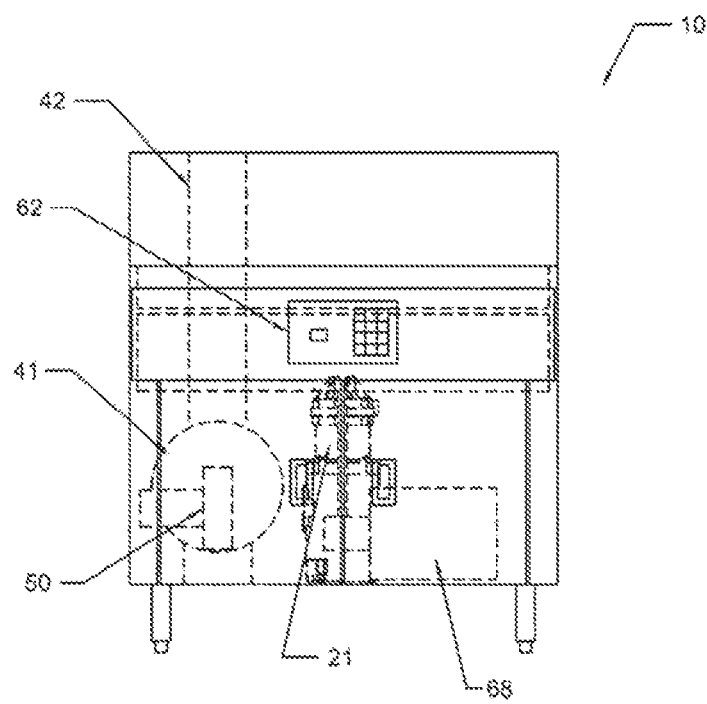
FIG. 2 B is a front view of the convection recirculating fryer of FIG. 1

FIG. 1 depicts the convection recirculating fryer 10 having a housing 11. The housing 11 of the fryer 10 can be comprised of a metal material. The housing 11 of the preferred embodiment 10 is a free-standing housing 11. FIG. 2A is a top view of the convection recirculating fryer 10. Alternatively, the housing 11 of the convection recirculating fryer 10 could comprise a smaller, counter-top model such as for home use. The principles of the invention described herein are not changed by scaling the fryer 10 up or down in size.

The fryer 10 also has a fry tank 13. See FIG. 1. The fry tank 13 of the preferred embodiment 10 is adapted to receive and hold cooking liquid (not depicted), such as cooking oil (e.g. animal fat shortening, vegetable-oil, or the like). The tank 13 of the preferred embodiment 10 has an open top, an oil inlet orifice 10 and an oil outlet orifice 17. Basically, the preferred tank 13 resembles a deep tub, or retangularly-cubic bucket The tank 13 is also preferably designed to receive a basket (not depicted). The basket typically houses a food product to be cooked in the cooking liquid. Other implementations of placing food to be cooked in the cooking liquid are, of course, possible. The present invention is not limited to any particular method and apparatus for exposing food products to a cooking liquid.

Figure 3:
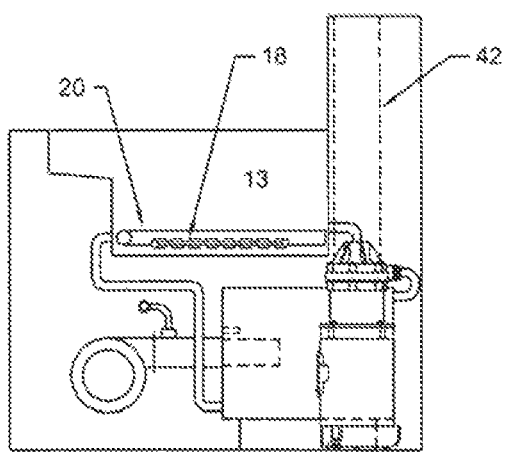
FIG. 3 is cut away view of the magnetic pump of the convection recirculating fryer of FIG. 1.

The tank 13 of the preferred convection recirculating fryer 10 may also comprise a filter apparatus 18, as depicted in FIG. 3. As depicted in FIG. 3, the filter apparatus is a screen 18 positioned along the bottom 19 of the tank 13. This apparatus maybe of any appropriate type; however, the preferred filtering apparatus is an active filtering device that pulls cooking liquid into the apparatus 18, removes foreign matter, and then deposits the cooking liquid back into the main compartment of the tank 13. The preferred filtering apparatus 18 is comprised of a frame that supports the filter material or "filter sock," and a gear pump. The filter sock is placed over the frame; which has a pipe connection at a bottom portion. The gear pump draws the cooking liquid from the tank 13, through the filter sock, through an oil dispersement pipe 20, a filter pump 68, and back into the tank 13. Contaminants in the cooking liquid are deposited on the filter sock where they become imbedded and remain there.

The fryer 10 also employs a passive filter (not depicted) at the oil outlet orifice 17 of the tank 13. The convection recirculating fryer 10 includes a magnetic pump 21 that draws cooking liquid from the tank 13. For this reason, a passive filtering apparatus could include a screen-type assembly releasably mounted in the cooking tank 13, and substantially covering the oil outlet orifice 17 of the cooking tank 13, for prohibiting larger foreign matter from entering into the magnetic pump 21 and disturbing heat exchanger 41.

As noted above, the tank 13 has an oil outlet orifice 17. This orifice 17 is preferably near a lower portion of the tank 13. This orifice 17 of the tank 13 is connected to pump inlet line 22. This inlet line 22 is designed to carry the cooking liquid to an inlet of the pump 21.

Figure 4:
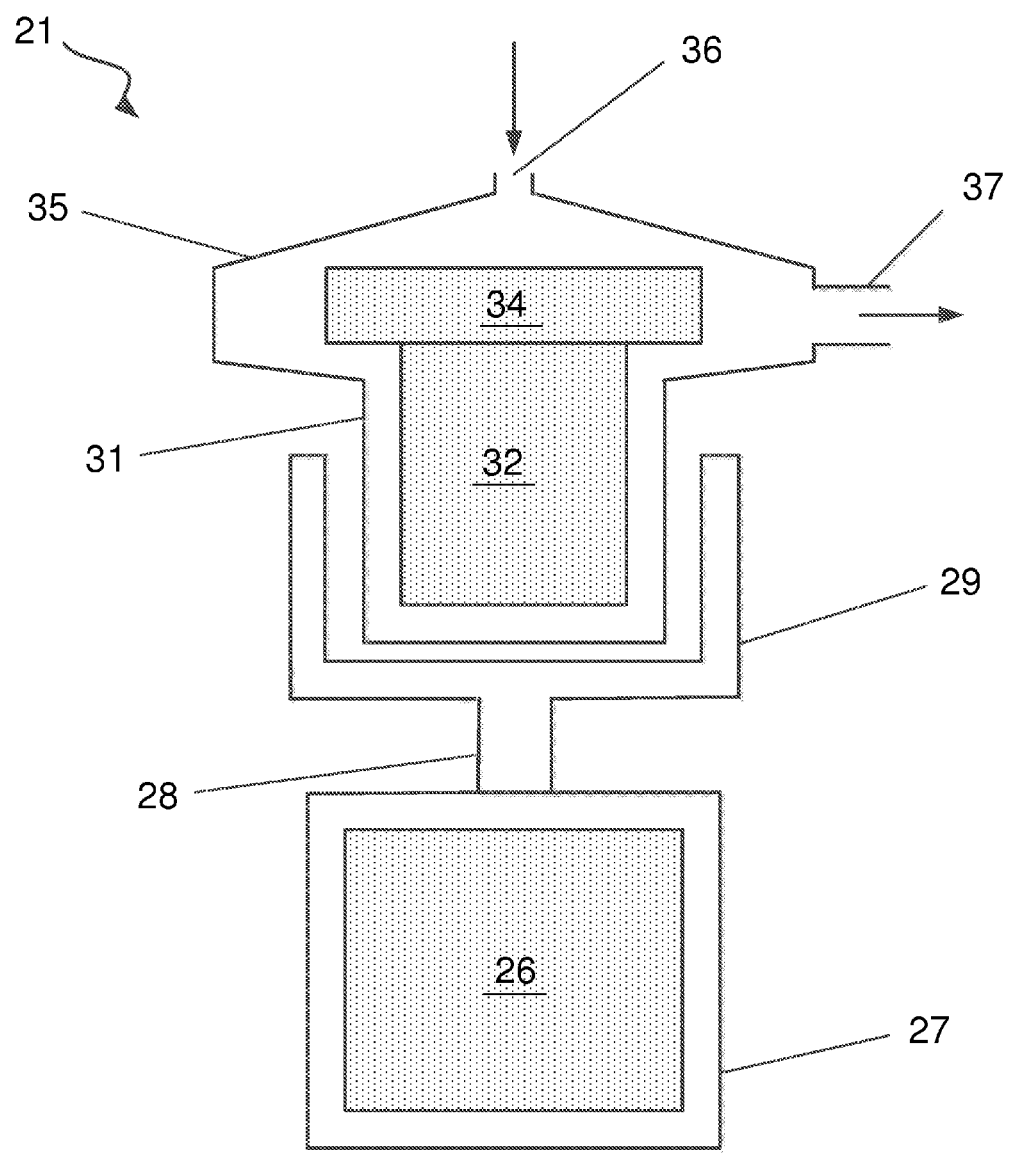
FIG. 4 is a cut away side view of a magnetic pump to be used in the convection recirculating fryer of FIG. 1.

The magnetic pump 21 is depicted in FIG. 4. The magnetic pump 21 comprises a motor 26 in a motor casing 27. A motor shaft 28 to be driven by the motor 26 protrudes from the motor casing 27 and is attached to a driving magnet assembly 29 comprising a driving magnet. The driving magnet assembly 29 of the preferred embodiment is cylindrical in shape. A magnet such as the driving magnet 29 can be manufactured from a Samarium Cobalt material which will withstand the high temperature of the cooking oil, Inside the cylindrical driving magnet assembly 29, with a plurality of magnets 66, is an impeller magnet housing, or casing 31. The impeller magnet housing 31 of the magnetic pump 21 is hermetically sealed so that any fluid in the impeller magnet housing 31 will not escape to an area exterior to the impeller magnet housing 31.

Inside the impeller magnet housing 31 is a driving magnet 32 and an impeller 34. As depicted, the driven magnet 32 and the impeller 34 may be a single unit, in an alternative embodiment, the impeller 34 and the driven magnet 32 may be separate elements connected by a shaft. As is understood by one with ordinary skill in the art, the impeller 34 is the actual device that moves fluid through the magnetic pump 21.

The impeller magnet housing 31 is preferably connected to a pump housing 35. The pump housing 35, in combination with the impeller magnet housing 31, encases the impeller 34. The pump housing 35 has a pump inlet 36 and a pump outlet 37. The cooking liquid is drawn from the tank 13, though the pump inlet line 22, into pump inlet 36 and into the pump housing 35 by the action of the impeller 34. The impeller 34 also, through its motion, ejects the cooking liquid from the pump housing 35 of the magnetic pump 21. The cooking liquid is ejected though the pump outlet 37 and into pump outlet line 38.

It is essential that the shaft 64 of the pump about which the impeller 34 turns be constructed of ceramic material to withstand the heat of the oil. A seal 67 prevents the leakage of oil from the pump.

The preferred motor 26 of the magnetic pump 21 has approximately 1.0 horsepower and will perform at approximately 3450 revolutions per minute. Of course, the motor 26 may be sized differently depending on the particular design of the convection reciprocating fryer 10. One having ordinary skill in the art will readily be able to size the motor 26 for a particular fryer.

Figure 5:
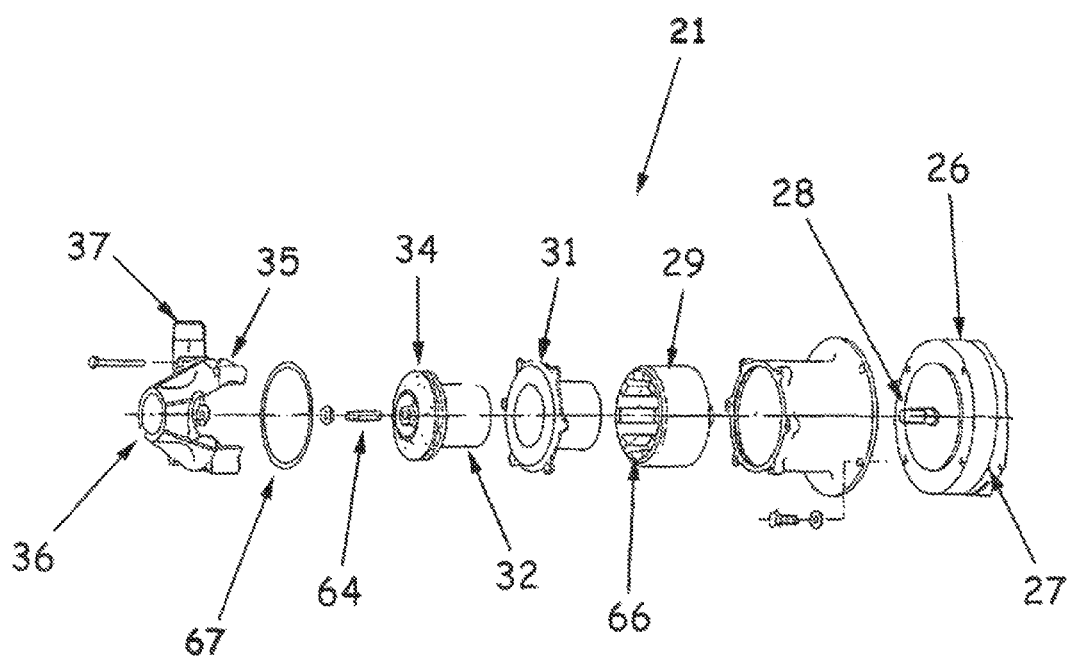
FIG. 5 is an exploded part view of a magnetic pump used in the convection recirculating fryer of FIG. 1.

FIG. 5 depicts an exploded part diagram of the magnetic pump to be used with the present preferred embodiment. FIG. 5 depicts that pump 21 comprises a motor 26 and a housing 27, a driving magnet assembly 29, an impeller magnet housing 31, an impeller 34, with driven magnets 32 and a pump housing 35. Of course, this is only one possible magnetic pump that may be used with the present invention.

As depicted in FIG. 2A, the magnetic pump 21 is preferably situated vertically within the fryer housing 11 in order to minimize the possibility of a steam look in the pump, which would prevent the circulation of the oil through the fryer. Although preferred in the exemplary embodiment 10, the pump is not required to be situated vertically. Also, the pump outlet 37 of the pump housing 35 is connected by the pump outlet line 38 to a heat exchanger 41.

The preferred heat exchanger 41 comprises a series of tubing (not depicted) with a heat source near, or even within, the tubing. In the preferred embodiment 10, the heat exchanger 41 comprises a cylindrical heat exchanger as is conventionally known in the art. The heat exchanger has a heat exchanger exhaust 42. The heat exchanger exhaust 42 of the heat exchanger 41 is in fluid communication with the pump outlet 37 of the pump 21 via the pump outlet line 38.

The heating element of the heat exchanger 41 preferably comprises a burner positioned along the axis of the heat exchanger 41. The heating element could be electric or gas powered, for example. It is preferred that the heating element, comprise an LP or natural gas powered burner. The heating element, of course, could also be equipped with a blower 50 in order to more evenly distribute heat throughout the heat exchanger 41.

Gas can be distributed through a gas manifold 58 as shown in FIG. 1A to a number of fuel injectors 56A-D to a fuel injector tube 52. Several fuel injectors are preferred for the even burning of the gas. It has been found that four injectors are preferred. The gas is ignited by a glow plug with a flame sensor 54 to make sure the gas is turned off if it does not ignite in a specified time. The flame extends from the fuel injector tube 52 into the heat exchanger 41 through a perforated burner sleeve 60. The convection recirculating fryer 10 is controlled by a controller 60.

The heat exchanger 41 is designed such that the cooking oil travels through heat exchanger tubing within the heat exchanger 41. The internal heat exchanger tubing is configured to permit the passage of the cooking oil back and forth across the burner within the heat exchanger. The internal tubing also includes fins for facilitating the absorption of heat from the burner.

The heated cooking oil is ejected from the heat exchanger 41 at the hot oil supply line 46. Preferably, the cooking oil is moved from the heat exchanger 41 at a constant predetermined temperature (which is usually around 350 degrees Fahrenheit). A control system (not depleted) operates in conjunction with a temperature sensor (not depicted) mounted on the outside of the hot oil supply line 46 to ensure that the cooking oil outlet from the heat exchanger 41 remains at the predetermined temperature. Obviously, if the temperature of the cooking oil drops below the target value, or range, the heating element is instructed by the control system to emit more heat energy into the cooking oil. Conversely, if the temperature of the cooking oil increases above the target value, or range, the heating element is caused to emit less heat energy.

The hot oil supply line 46 of the heat exchanger 41 is connected to the oil inlet orifice 16 of the tank 13. Thus, the cooking oil completes its journey from the tank 13, to the pump 21, to heat exchanger 41, and back, to the tank 13. As noted above, the magnetic pump 21 of the fryer 10 is the device that actually causes the cooking oil to flow from the tank 13, to the pump 21, to heat exchanger 41, and back to the tank 13. The appropriate rate of flow of the oil can be determined by one of ordinary skill in the art and is not important to the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s), of the invention without departing substantially from the spirit and principles of the invention. All such modifications and variations are intended to be included herein within the scope of this disclosure.

I claim:

1. A convection recirculating cooking apparatus, comprising:
    a fry tank for receiving a fluid, the fry tank comprising an interior spatial cavity for receiving and holding the fluid;
    a heat exchanger in fluid communication with the fry tank for heating the fluid to above about 350 degrees Fahrenheit as the fluid passes through the heat exchanger;
    a magnetic pump operatively connected to the fry tank for pumping the fluid through the heat exchanger; and
    a filter assembly operatively connected to the fry tank, the filter assembly comprising:
        (i) a filter pump for pumping the fluid through the filter assembly; and
        (ii) a filter mechanism spatially positioned within the interior spatial cavity of the fry tank and operatively connected to the filter pump; wherein the filter mechanism is configured for removing solid matter from the fluid.

2. The cooking apparatus of claim 1, wherein the filter pump is spatially positioned outside of the fry tank.

3. The cooking apparatus of claim 2, wherein:
    the fry tank defines an inlet and an outlet orifice for fluidly connecting the heat exchanger to the fry tank; and
    the cooking apparatus further comprises a screen-type assembly substantially covering the outlet orifice such that the screen-type assembly prohibits solid matter from entering the heat exchanger.

4. The cooking apparatus of claim 3, wherein the screen-type assembly is releasably mounted to the fry tank.

5. The cooking apparatus of claim 1, wherein the filter mechanism comprises a filter sock.

6. The cooking apparatus of claim 5, wherein the filter assembly further comprises a frame for supporting the filter sock, the frame being affixed to a bottom surface of the interior spatial cavity of the fry tank.

7. The cooking apparatus of claim 1, further comprising a means for heating the fluid as the fluid passes through the heat exchanger.

8. The cooking apparatus of claim 7, further comprising a controller for controlling the heating means.

9. The cooking apparatus of claim 8, wherein the means for heating the fluid as the fluid passes through the heat exchanger is a gas burner with a blower, an injector tube, and a plurality of symmetrically positioned gas injectors to evenly distribute the flame along a burner sleeve of the gas burner.

10. The cooking apparatus of claim 9, wherein the magnetic pump comprises an inlet in fluid communication with the fry tank and an outlet in fluid communication with the heat exchanger.

11. The cooking apparatus of claim 10, wherein the magnetic pump is positioned in a substantially vertical orientation such that the inlet is positioned above the impeller.

12. A convection recirculating cooking apparatus, comprising:
    a fry tank for receiving a fluid, the fry tank comprising an interior spatial cavity for receiving and holding the fluid and an exterior surface;
    a filter assembly operatively connected to the fry tank, the filter assembly comprising:
        (i) a filter mechanism spatially positioned within the interior spatial cavity of the fry tank, wherein the filter mechanism is configured for removing solid matter from the fluid, and wherein the filter mechanism comprises:

(a) a frame affixed to the interior spatial cavity of the fry tank; and
(b) a filter screen releasably mounted to the frame for removing solid matter from the fluid; and
(ii) a filter pump substantially located outside of the fry tank for pumping the fluid through the filter assembly;
a magnetic pump operatively connected to the fry tank for pumping the fluid through a heat exchanger; and
a heat exchanger in fluid communication with the fry tank for heating the fluid as the fluid passes through the heat exchanger, wherein the heat exchanger is positioned outside the fry tank and configured such that it does not directly heat the exterior surface of the fry tank so as to avoid scorching the solid matter removed from the fluid by the filter screen.

13. The cooking apparatus of claim 12, wherein the heat exchanger is configured to heat the fluid to a temperature above about 350 degrees Fahrenheit.

14. The cooking apparatus of claim 13, wherein:
the fry tank defines an inlet and an outlet orifice for fluidly connecting the heat exchanger to the fry tank; and
the cooking apparatus further comprises a screen-type assembly substantially covering the outlet orifice such that the screen-type assembly prohibits solid matter from entering the heat exchanger.

15. The cooking apparatus of claim 14, wherein the screen-type assembly is releasably mounted to the fry tank.

16. A convection recirculating frying apparatus, comprising:
a fry tank for receiving cooking oil, the fry tank comprising an interior spatial cavity for receiving and holding the cooking oil and an exterior surface;
a heat exchanger in fluid communication with the fry tank for heating the cooking oil as the cooking oil passes through the heat exchanger, wherein the heat exchanger is positioned outside the fry tank and comprises a means for heating the cooking oil as the cooking oil passes through the heat exchanger, wherein the means for heating the cooking oil is configured such that it does not directly heat the exterior surface of the fry tank;
a magnetic pump operatively connected to the fry tank for pumping the cooking oil through the heat exchanger; and
a filter assembly operatively connected to the fry tank, the filter assembly comprising:
(i) a filter mechanism spatially positioned within the interior spatial cavity of the fry tank, wherein the filter mechanism is configured for removing solid matter from the fluid, and wherein the filter mechanism comprises:
a. a frame for supporting a filter sock, wherein the frame is affixed to the interior surface of the fry tank; and
b. a filter sock, wherein the filter sock is releasably attached to the frame;
(ii) an oil dispersement pipe operatively coupled to the frame and having one or more inlets positioned to pull the cooking oil through the filter sock; and
(iii) a gear pump spatially located outside of the exterior surface of the fry tank, wherein the gear pump is operatively adapted to pump the cooking oil through the filter sock.

17. The convection recirculating frying apparatus of claim 16, wherein the heat exchanger is configured to heat the cooking oil to a temperature above about 350 degrees Fahrenheit.

18. The convection recirculating frying apparatus of claim 16, wherein filter assembly is located at the bottom of the interior spatial cavity of the fry tank.

19. The convection recirculating frying apparatus of claim 18, wherein the means for heating the cooking oil is configured such that it does not directly heat the exterior surface of the fry tank and avoids scorching the solid matter removed from the cooking oil by the filter sock.

20. The convection recirculating frying apparatus of claim 19, wherein:
the fry tank defines one or more orifices for fluidly connecting the heat exchanger to the fry tank; and
the convection recirculating frying apparatus further comprises a screen-type assembly substantially covering at least one of the one or more orifices such that the screen-type assembly prohibits solid matter from entering the heat exchanger.

\* \* \* \* \*